United States Patent [19]

Scott

[11] Patent Number: 5,211,513

[45] Date of Patent: May 18, 1993

[54] APPARATUS FOR SELECTIVELY SUPPORTING AND RELEASING A CARRIER IN A PNEUMATIC TUBE TRANSPORTATION SYSTEM

[75] Inventor: Lowell L. Scott, Burlington, Ky.

[73] Assignee: Hamilton Air Products, Fairfield, Ohio

[21] Appl. No.: 835,899

[22] Filed: Feb. 14, 1992

Related U.S. Application Data

[63] Continuation-in-part of Ser. No. 681,923, Apr. 8, 1991, Pat. No. 5,147,154.

[51] Int. Cl.$^5$ ............................................. B65G 51/04
[52] U.S. Cl. .................................... 406/112; 406/148
[58] Field of Search ................. 406/13, 112, 148, 151, 406/153, 176

[56] References Cited

U.S. PATENT DOCUMENTS

| | | | |
|---|---|---|---|
| 2,912,066 | 11/1959 | Ellithorpe | 406/112 X |
| 3,053,475 | 9/1962 | Tonne | 406/112 X |
| 3,738,592 | 6/1973 | Smith et al. | 406/112 X |
| 4,971,481 | 11/1990 | Foreman | 406/112 X |

Primary Examiner—Russell D. Stormer
Assistant Examiner—Andrew C. Pike
Attorney, Agent, or Firm—Beveridge, DeGrandi, Weilacher

[57] ABSTRACT

A simplified apparatus selectively supports a carrier within a pneumatic tube transportation system station, and releases the carrier for transport within the system. The apparatus responds to controlled air pressures within the station, and to the momentum of the carrier for holding and releasing the carrier. In a preferred embodiment of the apparatus, an interior mounting, adapted to be disposed within a customer or teller station, pivotably mounts a detent member. A biasing device having elasticity, such as a torsion spring, biases the detent member to a first position wherein a contact portion of the member supports the carrier. A release device responds to controlled air pressures to urge the detent member against the biasing device to release the carrier. The present invention also pertains to a station incorporating the disclosed apparatus, and to a banking service pneumatic tube system including at least one station equipped with the disclosed apparatus.

20 Claims, 5 Drawing Sheets

APPARATUS FOR SELECTIVELY SUPPORTING AND RELEASING A CARRIER IN A PNEUMATIC TUBE TRANSPORTATION SYSTEM

This application is a continuation-in-part of U.S. application Ser. No. 07/681,923 filed on Apr. 8, 1991, now U.S. Pat. No. 5,147,154.

BACKGROUND OF THE INVENTION

The present invention pertains to an apparatus for selectively supporting and releasing a carrier in a station for a pneumatic tube carrier transportation system, a station incorporating such an apparatus, and a tanking service pneumatic tube system including a station arranged with the disclosed apparatus.

Advance has been made in limiting the number of components and in simplifying the construction of banking service pneumatic tube transportation systems. For example U.S. Pat. No. 3,659,809 discloses a spring catch to selectively retain a carrier within a carrier chamber, or to release the carrier into the tube network. The spring catch is under solenoid control. U.S. Pat. No. 3,659,809 also discloses a multiple-chamber and valve arrangement for regulating pressure in order to control transport of the carrier between stations.

Other efforts have been directed to receiving the carrier and operating the station access door for customer or teller access of the carrier. For instance, according to U.S. Pat. No. 4,352,603, the carrier triggers switches which lock or unlock door means accordingly. Pressure build ups are created to slow the carrier. U.S. Pat. No. 3,790,102 relates to a pneumatic carrier terminal having a motor driven cam. The cam opens the tube door and lifts the carrier to the user simultaneously. When the carrier is to be transported to a different terminal, this operation is reversed.

U.S. Pat. Nos. 3,985,316; 4,913,598; 4,930,941; and 4,941,777 disclose still other pneumatic tube conveying arrangements.

SUMMARY OF THE INVENTION

The apparatus in accordance with the present invention provides an improved, still more simplified structure for admitting a carrier to within a carrier chamber, and retaining the carrier therein for easy access through an access door to the chamber. The apparatus comprises a housing structure adapted for mounting within a station of a banking system pneumatic tube transportation system, and a detent and release mechanism provided in the housing. The housing structure defines a network of passages, ports therebetween, and valves which are pressure responsive. The detent and release mechanism likewise responds to air pressure created by an air pressure regulation device, and acts to properly position a detent member for selectively supporting or releasing the carrier. The detent and release mechanism according to the present invention does not require separate, electronically actuated elements. Rather, it is operationally controlled by spring bias asserted by a bias member, and by air pressure selectively created by the pressure regulation device to work against the force of the spring bias.

In the preferred embodiment, the detent and release mechanism in accordance with the invention comprises a piston assembly, a pivotally mounted detent member, and a biasing spring which acts to maintain the detent member in a position for supporting a carrier. The piston assembly responds to air pressures developed in a coupling chamber immediately above the piston. Air pressure developed within the coupling chamber forces the piston assembly to move downwardly against the spring bias of the detent member spring to rotate the detent member in order to release the carrier. Further, the spring bias of the detent spring means is set such that the force of a carrier arriving at the station will cause the detent member to pivot against the spring bias in order to allow the carrier to be received within the carrier chamber.

Also, in the preferred embodiment of the apparatus, the interior housing structure defines a carrier chamber, a coupling chamber, an intermediate chamber, and a detent chamber. The carrier chamber communicates directly with the tube of a single-tube conveying network to receive and send the carrier. The coupling chamber has a port which is placed in communication with either a pressure regulation apparatus or the atmosphere. The coupling and carrier chambers are selectively placed in communication by a pressure-responsive valve provided therebetween. The latter two chambers also can be coupled for communication through an intermediate chamber which has a cylindrical guide member therein for guiding the motion of the piston assembly. The guide member has ports and the intermediate chamber has ports opening into the carrier chamber such that when the piston assembly is forced downwardly by high pressure in the coupling chamber relative to the carrier chamber, the piston assembly eventually moves into a position wherein high pressure air from the coupling chamber is conducted through the guide member through its ports, and through the port of the intermediate chamber to pressurize the carrier chamber and thus the entire tube network to move the carrier therethrough. When the pressure regulation apparatus is deactivated, the piston assembly is urged to return to its upper position due to the spring bias of the detent member which remains in contact therewith.

The present invention further relates to a banking service station equipped with the apparatus according to the present invention. The station may be either a teller station or a customer station. Still further, the invention relates to a banking service pneumatic tube system which includes at least one station that incorporates an apparatus in accordance with the present invention.

Briefly, an apparatus for selectively supporting a carrier within a pneumatic tube station and releasing the carrier for transport through a tube network from the station comprises: an interior mounting adapted to be disposed within a pneumatic tube station, a detent member having a first portion, a second portion, and a third portion which is adapted for pivotably mounting the detent member to the interior mounting, means having elasticity for biasing the detent member towards a first position wherein the first portion thereof contacts a carrier to support the carrier within the station, and release means adapted to engage said second portion of the detent member and urge the detent member against the biasing by the elastic means in response to air pressure, whereby the detent member pivots to move the first portion thereof out of contact with the carrier to release the carrier.

A station for providing access to a carrier in a pneumatic tube transportation system comprises: a first airpassage means for providing communication with a transport tube of the transportation system, and a second air-passage means, means defining a carrier chamber in communication with the first air passage means, a coupling chamber in communication with the second air-passage means, a detent chamber in communication with the carrier chamber and the first air passage means, and an intermediate chamber located between the coupling chamber and the detent chamber and having a port for placing the intermediate chamber in communication with the carrier chamber, a valve which closes to prevent air flow directly from the coupling chamber to the carrier chamber in response to greater pressure in the coupling chamber than is present in the carrier chamber, a detent member pivotally mounted within the detent chamber, the detent member having a first portion which extends into the carrier chamber to support a carrier when the detent member is in a first position and a second portion which extends into the detent chamber, a biasing mechanism for biasing the detent member into its first position, and a piston and link assembly responsive to air pressure increases in the coupling chamber for urging the second portion of the detent member against the bias of the biasing mechanism to place the detent member in a second position wherein the first detent member portion is substantially withdrawn from within the carrier chamber.

Further, a banking service pneumatic tube system for transporting a carrier between teller and customer terminals along a single conveyor tube network to which a first air passage of each of said terminals is connected comprises: an air pressure regulator apparatus connected to a second air passage of one of the terminals, the other of the terminals having a second air passage in communication with atmospheric pressure, means defining a carrier chamber in communication with the first air passage, a coupling chamber in communication with the second air-passage, a detent chamber in communication with the carrier chamber and the first air passage, and an intermediate chamber located between the coupling chamber and the detent chamber and having a port for placing the intermediate chamber in communication with the carrier chamber, a valve which closes to prevent air flow directly from the coupling chamber to the carrier chamber in response to greater pressure in the coupling chamber than is present in the carrier chamber, a detent member pivotally mounted within the detent chamber, the detent member having a first portion which extends into the carrier chamber to support a carrier received within the carrier chamber when the detent member is in a first position, and a second portion which extends into the detent chamber to place the detent member in a second position wherein the first detent member portion is substantially withdrawn from within the carrier chamber, a biasing mechanism for biasing the detent member into its first position, and a piston and link assembly comprising a piston responsive to air pressure in the coupling chamber for urging the second portion of the detent member against the bias of the biasing mechanism when air pressure in the coupling chamber causes the valve to close.

BRIEF DESCRIPTION OF THE DRAWINGS

Further aspects and features of the present invention will be even more apparent from the following detailed description and drawings, and the appended claims. In the drawings:

DETAILED DESCRIPTION OF THE PREFERRED EMBODIMENTS

Figure 1:
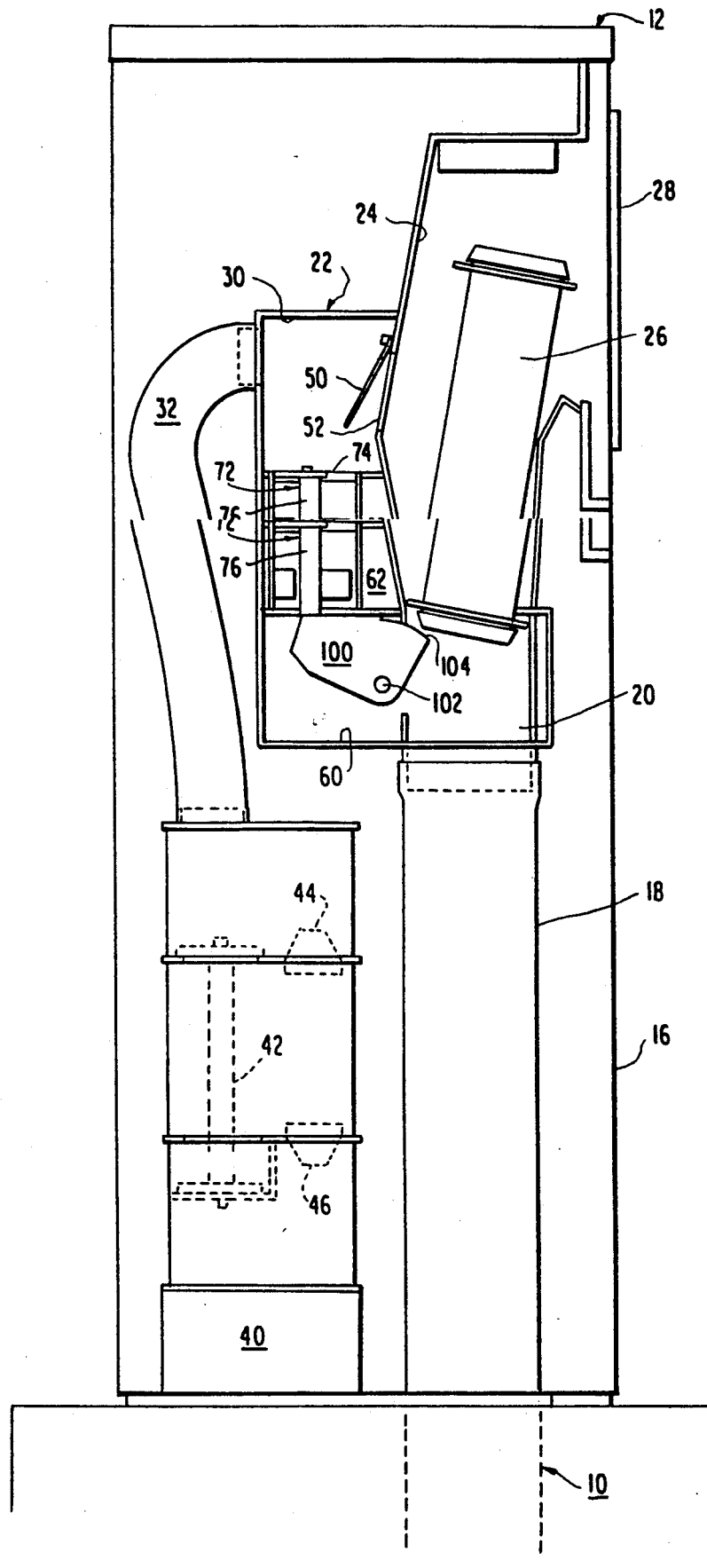
FIG. 1 is an internal side view of a customer station of a banking service pneumatic tube system equipped in accordance with the present invention.
Figure 2:
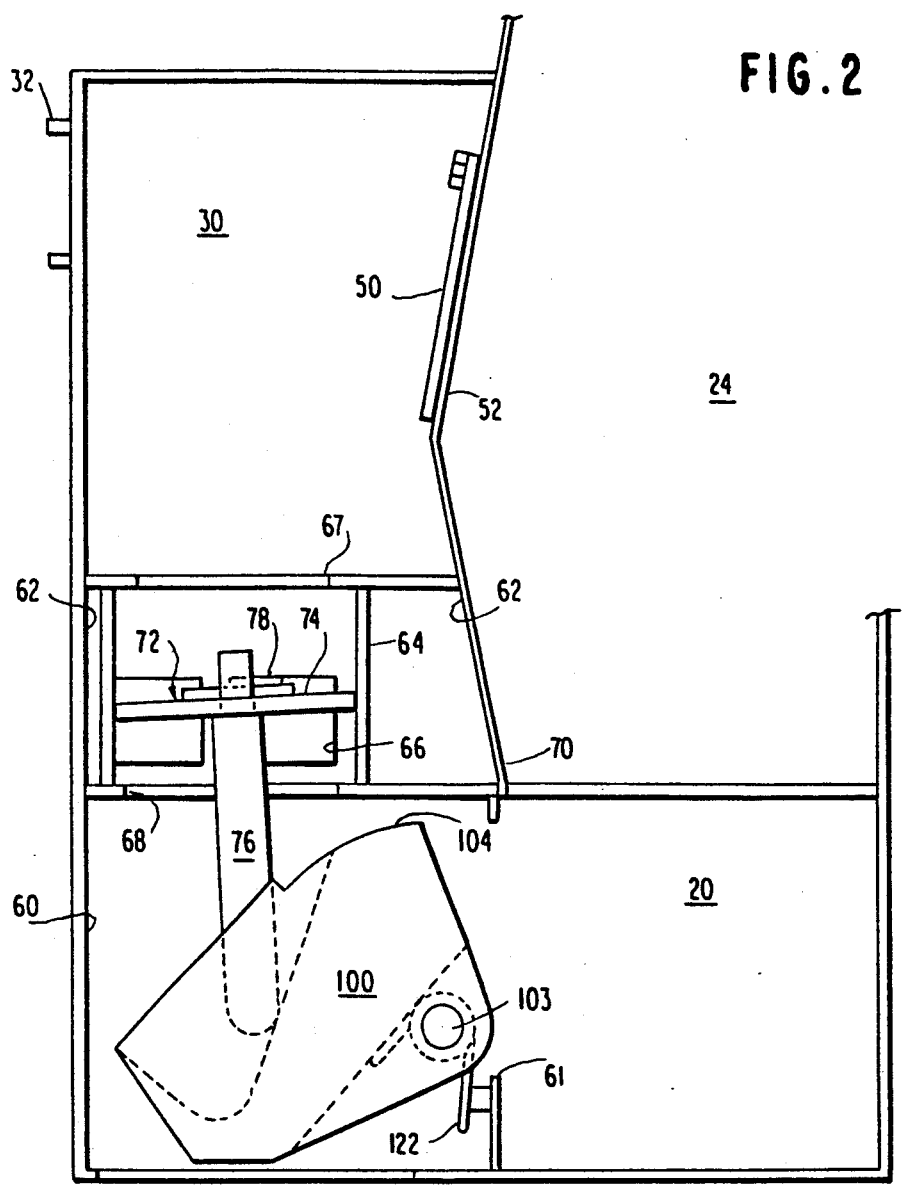
FIG. 2 is an enlarged internal side view of the interior housing and the detent and release mechanism provided in the customer station of FIG. 1.
Figure 5:
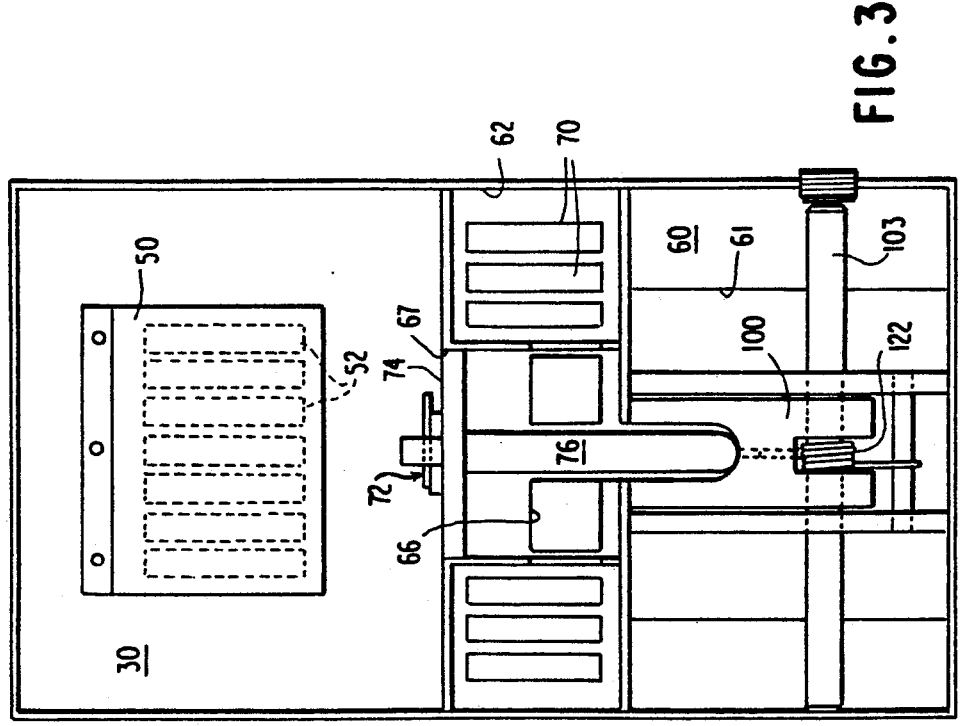
FIG. 5 is a view, similar to FIG. 1, of a teller station.

FIGS. 1 and 2 show a customer station for a banking service pneumatic tube system incorporating a detent and release apparatus in accordance with the present invention. The banking service system comprises a tube network 10, the major portions of which are located underground to connect the customer station 12 with a teller station 14 (FIG. 5). Customer station 12 rests upon a concrete island through which the tube network 10 extends.

Customer station 12 has a housing 16 into which the tube network 10 is received. The received tube network portion 18 is attached to a detent tube 20 provided in an interior housing 22. The detent tube 20 is an extension of a carrier chamber 24 which has dimensions sufficient to receive the carrier 26. When the carrier 26 is received within chamber 24, it is accessible to the customer via station access door 28.

Interior housing 22 also defines three further chambers which are controlled for communication with detent tube 20 and carrier chamber 24. A coupling chamber 30 selectively communicates with carrier chamber 24 to connect the carrier chamber by an air inlet passage 32 to a pressure regulation turbine apparatus 40. Pressure regulation apparatus 40 is the subject of the applicants' U.S. Pat. application Ser. No. 07/681,923 filed on Apr. 8, 1991, now U.S. Pat. No. 5,147,154, the disclosure of which is incorporated by reference herein. Turbine apparatus 40 is schematically shown in FIG. 1 as including a spool-type valve member 42 movable between two pressure regulation positions, and upper and lower pumps 44, 46 for controlling the position of the valve member. Together with the valve member 42, pumps 44, 46 control air pressure in the input passage 32 for use in the entire tube system 10.

Figure 3:
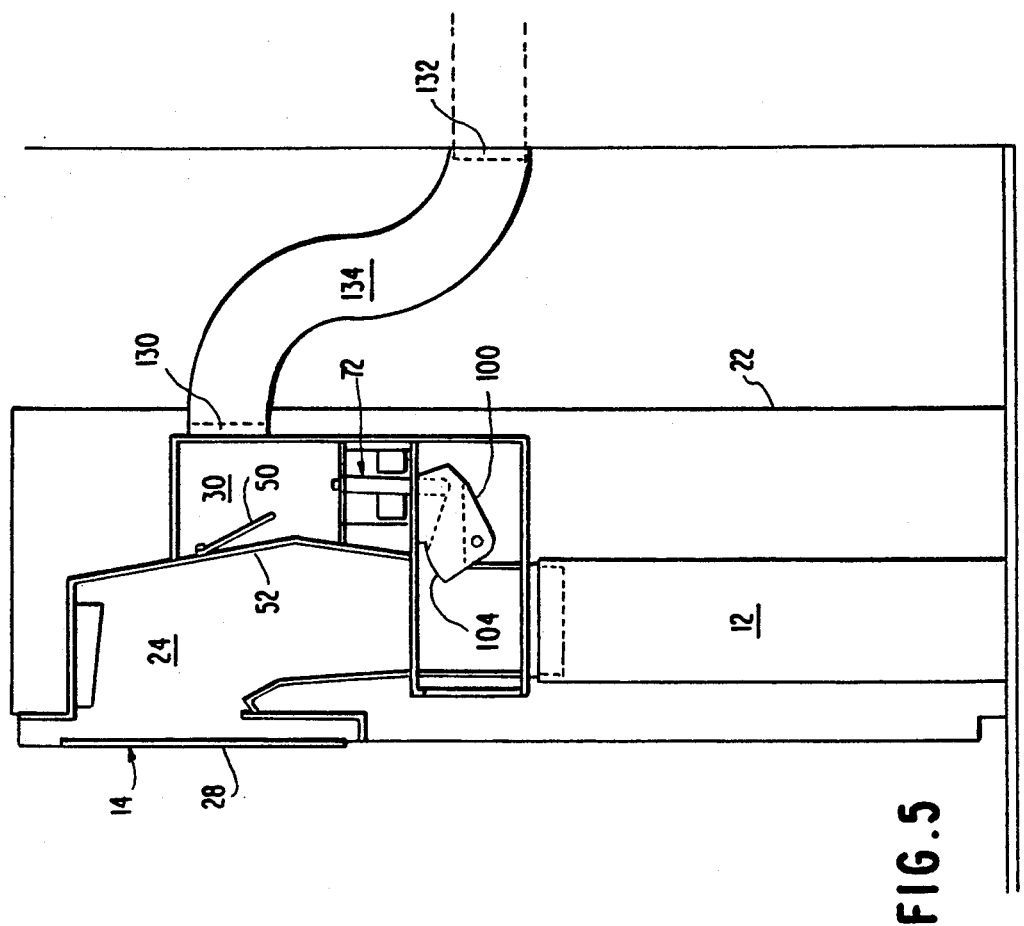
FIG. 3 is a front, internal view of the housing and the detent and release mechanism.

With reference also to FIG. 3, a check valve 50 is located to cooperate with ports 52 for selectively allowing communication between carrier chamber 24 and coupling chamber 30. Valve 50 is arranged so that when the pressure in carrier chamber 24 exceeds that of coupling chamber 30, valve 50 is open. When the coupling chamber pressure increases rapidly with respect to the carrier chamber pressure, valve 50 responds by forming an airtight closure between chambers 24 and 30.

From a detent chamber 60 located to the left of detent tube 20 in FIG. 2, a portion of a detent member 100 is arranged to extend into the detent tube 20. Detent member 100 thereby supports the carrier 26 in order to make the carrier accessible at door 28. An opening 61 is provided between chamber 60 and tube 20 to permit extension of the detent member 100 into the tube. Detent member 100 is pivotally mounted within detent chamber 60 at pivot mounting or journal 102. As such, the detent member 100 is pivotable so that its contacting portion 104 provides a rest for carrier 26 when the carrier is received within the chamber 24. An intermediate chamber 62 is located above detent chamber 60. Intermediate chamber 62 contains a cylinder 64 with ports 66 through the sidewalls thereof. Cylinder 64 is placed over a port 68 which provides communication between detent chamber 60 and cylinder 64. Another port 67 provides communication between coupling chamber 30 and intermediate chamber 62. Also, ports 70 are provided to permit communication directly between intermediate chamber 62 and carrier chamber 24.

Cylinder 64 acts as a guide member for a piston and link assembly 72 disposed therewithin. Assembly 72 comprises a piston 74 adapted for reciprocal movement within cylinder 64 when the piston is subjected to air under pressure in coupling chamber 30, through port 67. Piston 74 and its guide cylinder 64 cooperate in such a way that these elements act as another valve between coupling chamber 30 and carrier chamber 24. When coupling and carrier chambers 30, 24 are at substantially the same pressure, piston 74 is in the its up position as shown in FIGS. 1 and 3. In this position, piston 74 substantially obstructs air flow from coupling chamber 30 to carrier chamber 24 through cylinder ports 66 and port 70. When chamber 30 is pressurized and check valve 50 closes, the pressure build up forces piston 74 into a downward position as shown in FIG. 2, past ports 66 to open a flow path from the coupling chamber through cylinder 64, through cylinder vents 66, and through ports 70 to the carrier chamber 24 to pressurized the carrier chamber. In the preferred embodiment, piston 74 is disk-like and is mounted to a plunger 76 by a washer and cotter pin arrangement 78. Alternatively, other conventional piston and link assemblies may be substituted for assembly 72 a appreciated by those of ordinary skill in the art. Plunger 76 extends downwardly from piston 74 into contact with detent member 100.

Figure 4A:
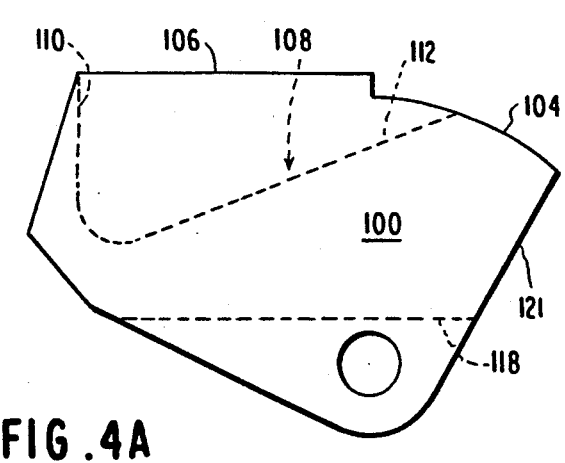
FIGS. 4A and 4B are isolated views of a preferred detent member in accordance with the present invention.
Figure 4B:
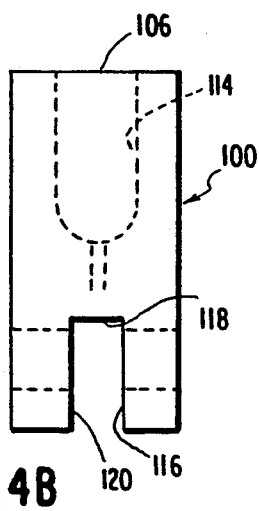

Detent member 100 also is shown in front cross-sectional view in FIG. 3, and in isolated views in FIGS. 4A and 4B. Detent member 100 is seen to have an upper portion 106 which terminates in an arcuate, cam-like contacting portion 104 for carrier support. A cut-out section 108 is defined by a vertical inner wall 110, a sloping wall 112, and parallel, vertical side walls 114. Detent member 100 further has a slot 116 formed by a horizontal interior wall 118 which is located above the opening for journal 102 and vertical sidewalls 120. As may best be seen from FIG. 2, plunger 76 is received within the deepest portion of section 108, proximate vertical wall 110. Detent member 100 is formed of a sufficiently hard material so that its flat external wall 121 absorbs the impact of a carrier arriving from tube network 10.

To counter-act the weight of piston and link assembly 72 and that of detent member 100 itself, a torsion spring 122 is provided. In the preferred embodiment, spring 122 is supported upon journal member 103, within slot 116. However, other arrangements for elastically biasing detent member 100 also now will be apparent to one of ordinary skill in the art. Spring 122 biases detent member 100 in a clockwise direction against plunger 76 in order to maintain arcuate contact portion 104 in the position shown in FIG. 1. As described above, air pressure force applied against piston 74 overcomes the elastic force of spring 122. Also, spring 122 is selected so that the momentum of the arriving carrier 26, as the carrier impacts against detent wall 121, causes the detent member to pivot counterclockwise to permit receipt of the carrier into chamber 24.

With reference now to FIG. 5, teller station 14 is seen to be similar to the customer station 12. Teller station 14 differs from customer station 12 in omitting the air regulation apparatus 40 as only one such apparatus is required in the system. Instead, teller station 14 has a port 130 which is connected to an exterior vent 132 by the passage 134. Of course, it also is understood that regulation apparatus 40 could be arranged in teller station 14 rather than the customer station 12. Teller station 14 likewise includes an interior housing 22 which is partitioned in the same way as customer station 12. Teller station 14 includes a detent member 100 of the type shown in detail in FIGS. 4A and 4B for retaining a carrier within its carrier chamber 24. Detent member 100 likewise is spring-biased to position its contacting portion 104 to engage an end of the carrier. In teller station 14, a piston and link assembly 72 also responds to air pressure within coupling chamber 30 to rotate detent member 100 in, order to permit release of the carrier into the tube network 10.

In operation, to transport the carrier 26 from the customer station 12 to the teller station 14, the customer would operate a control (not shown) to signal the system that transport of the carrier is desired. With the customer door 28 closed, pump 44 of pressure regulation apparatus 40 is actuated in order to pressurize coupling chamber 30 via passage 32. Incoming air into coupling chamber 30 closes check valve 50, and creates a downward force on the piston and link assembly 72 through port 67. The high pressure force overcomes the bias of detent spring 122 and the detent member 100 rotates counterclockwise in FIG. 1. This causes contact portion 104 of the detent member 100 to slide away from contact with the carrier 26 and the carrier is released.

Piston and link assembly 72 will continue to be forced downwardly into detent chamber 60 until ports 66 in cylinder 64 are placed in communication with carrier chamber 24 through ports 70 and intermediate chamber 62. Air under pressure is thus conducted into carrier chamber 24 to drive the carrier 26 to teller station 14 through the tube network 10. As the carrier 26 approaches the teller station 14, air pushed by the advancing carrier enters the carrier chamber 24 of the teller station through ports 52 and opens the teller station check valve 50 to provide communication with the exterior wall vent 132 via passage 134. Exhaust air is this vented through vent 132. When the carrier 26 arrives within detent tube 20 of station 14, the impact of the incoming carrier against detent member wall 121 overcomes the spring 122 of detent member 100 and rotates the detent member clockwise whereupon the carrier enters chamber 24. Once the carrier 26 has passed, the elasticity of spring 122 rotates teller station detent member 100 counterclockwise to position the contact portion 104 for supporting the carrier 26 within the teller station carrier chamber. Then, the pump 44 of the pressure regulation apparatus 40 in customer station 12 is turned off and the teller station door 28 is opened whereupon the carrier 26 is available for a teller transaction.

To return the carrier 26 from the teller station 14 to the customer station 12, the teller station door 28 is closed whereafter the teller likewise operates a system control to call for a teller send operation. After the teller station door 28 is closed, pump 46 in the customer station 12 is activated to create negative pressure in air passage 32 of customer station 14, whereby air is drawn out of coupling chamber 30. "Negative" pressure, i.e., partial vacuum conditions, within coupling chamber 30 causes customer station check valve 50 to open to draw air from the entire tube network 10 through carrier chamber 24 thereof. Further, negative pressure also is induced in teller station carrier chamber 24 above the carrier 26 while the carrier still is held in the teller station 14. This negative pressure is created through transmission through teller station carrier chamber 24, and through port 61, port 68, ports 66 in cylinder 64, and through ports 70 of the intermediate chamber. Negative pressure in teller station carrier chamber 24 causes check valve 50 to close off ports 52 in the teller station. In this condition, teller station coupling chamber 30 and the upper portion of teller station piston and link assembly 72 are exposed to atmospheric pressure through port 130, which communicates with the exterior wall vent 132. A pressure differential on the piston and link assembly forces the piston 74 and plunger 76 down. This force overcomes the detent member spring 122 of teller station detent member 100 and rotates the detent member clockwise to retract contact surface 104 to release the carrier 26 from the teller station. As explained in connection with carrier release from the customer station 12, teller station piston 74 likewise continues downward motion until ports 66 of the cylinder 64 are in open communication with teller station carrier chamber 24. Thus, atmospheric pressure enters teller station carrier chamber 24 through intermediate chamber ports 70. Air under atmospheric pressure is conducted along network 10 to drive the carrier 26 through the underground network back to the customer station 12.

Figure 6:
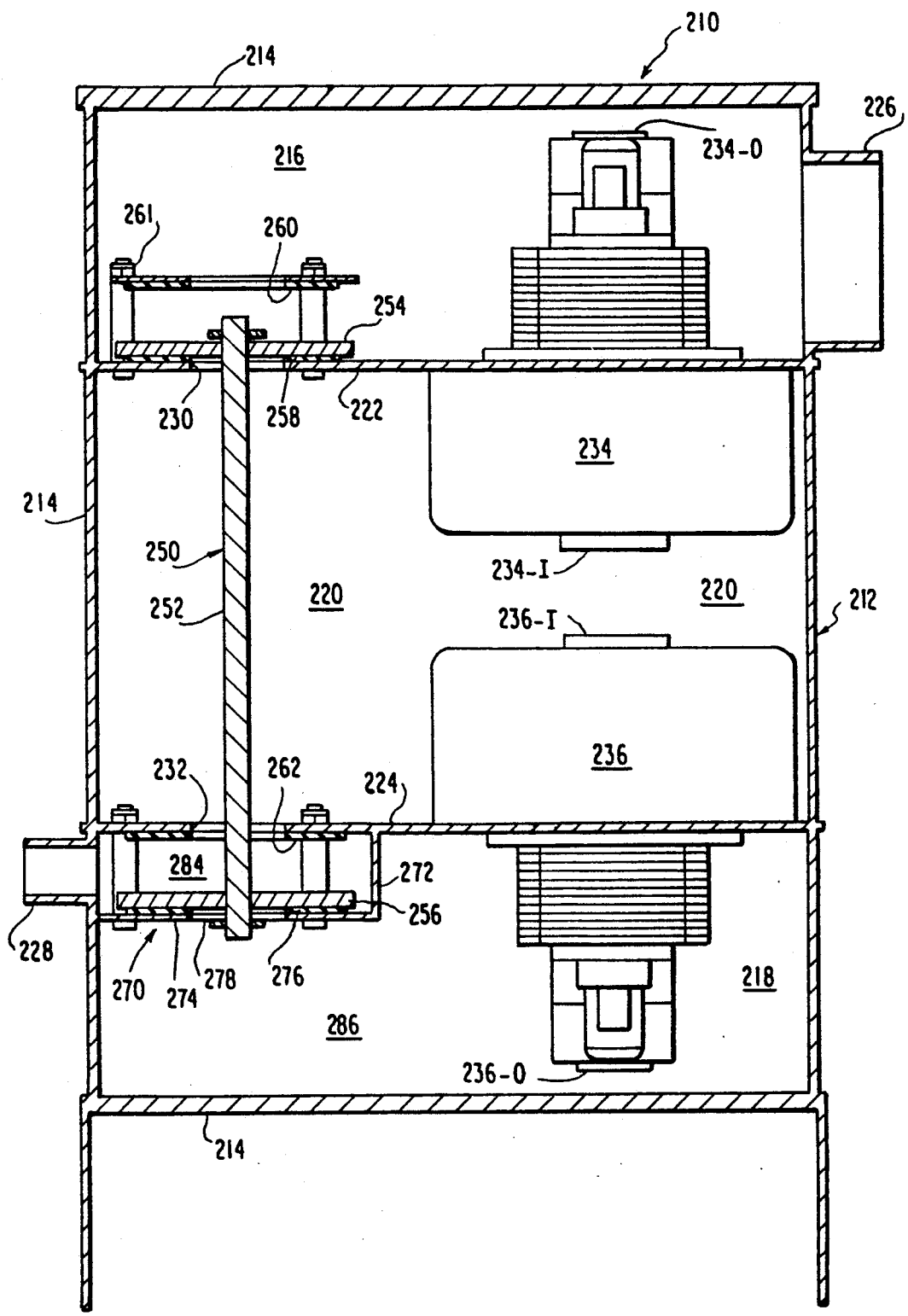
FIG. 6 is a partial side cross-sectional view of a pressure regulation device suitable for use in a banking service terminal, or a banking service pneumatic tube system in accordance with the present invention.

FIG. 6 shows a first embodiment of the preferred pressure regulation device 210 disclosed in U.S. Pat. application Ser. No. 07/681,923, filed on Apr. 8, 1991. Regulator 210 is shown as comprising a generally rectangular housing 212 with exterior side, upper, and bottom walls 214. The interior of housing 212 is partitioned to define three flow chambers including an upper flow chamber 216, a lower flow chamber 218, and a central flow chamber 220 by generally parallel interior walls 222 and 224. Upper chamber 216 has a work port 226. Similarly, lower flow chamber 218 is provided with an intake/exhaust port 228. Regulator 210 is bi-directional, that is air can be taken in or exhausted at either of ports 226 and 228.

Bores 230 and 232 are provided through interior walls 222 and 224, respectively, to provide communication between flow chambers 216, 220, and 218. Communication between flow chambers 216, 220, and 218 also is provided by two pump elements 234 and 236. Pump elements 234 and 236 are conventional low pressure, high volume pumps and are one-directional in the sense that both pumps are arranged to force air only from central chamber 220 to upper chamber 216 or lower chamber 218. Pump 234 has an intake 234-I in central flow chamber 220 and an outlet 234-0 in upper chamber 216. On the other hand, lower pump unit 236 pulls air downwardly from its intake 236-I in central flow chamber 220 to its outlet 236-0 in lower flow chamber 218.

A spool-type valve member 250 is provided to alternatively obstruct bores 230 and 232. Spool-type metallic valve member 250 comprises a rod portion 252 that terminates in two opposing piston portions 254 and 256. Rod portion 252 has an elongate, generally cylindrical shape while pistons 254 and 256 have a generally disk-like construction. Valve member 250 is seen to traverse central flow chamber 220 so that its upper piston 254 is located within upper flow chamber 216 while its lower piston 256 is located within lower flow chamber 218. Upper flow chamber 216 also is seen to have two generally ring-like valve seat portions therein. Valve seat 258 concentrically surrounds the bore 230 in upper interior wall 222. Valve seat 260 is located upwardly from valve seat 258 and may be mounted within flow chamber 216 in any conventional way such as by spacers 261. Another valve seat 262, like valve seat 258, is provided in a concentric relationship around bore 232 on lower interior wall 224.

An air dam means 270 is disposed within lower flow chamber 218. Air dam means 270 has a downwardly-extending section 272 which depends from lower interior wall 224. A generally horizontal section 274 connects the downwardly-extending section 272 to an exterior wall 214 of the housing 212 and provides support for a valve seat portion 276 for lower piston 256. Horizontal section 274 has a bore 278.

Valve seats 258, 260, 262, and 276 define two distinct positions for valve member 250. Piston 254 resting on valve seat 258, and piston 256 resting on seat 276 define the static or rest position for the valve member 250, which position the valve member assumes due to gravity where neither of the pumps 234, 236 are activated. This position of the valve member can be referred to as the "customer send" position because when pump 234 is activated, air is forced out of work port 226. Piston 254 thereby substantially prevents air flow between upper flow chamber 216 and central flow chamber 220 through port 230. Meanwhile, piston 256 is received on valve seat 276 to open a flow path from intake/exhaust port 228 through a subchamber 284 of lower flow chamber 218 and through bore 232 to provide an air source for upper pump 234. Valve member 250 and air dam means 270 is understood as cooperating to substantially isolate the remainder of lower chamber 218, hereinafter referred to as sub-chamber 286, when piston 256 engages valve seat 276. When pump 234 is activated, air is provided for upper pump 234 from intake/exhaust port 228 through bore 232. Whenever pumps 234 and 236 are operative, central flow chamber 220 has a lower pressure than one of chambers 216 and 218 as the operative pump causes partial vacuum conditions in the central chamber. Operation of upper pump 234 increases the pressure in upper chamber 216 relative to chambers 218 and 220 whereby valve member 250 is held down in its customer send position shown in FIG. 6 by air pressure developed in the upper chamber. Pump 234 thus drives air entering central flow chamber 220 through bore 232 into upper flow chamber 216 and out of work port 226.

To reverse the air flow in device 210, pump 234 is deactivated and pump 236 is activated. When pump 236 is activated, air dam 270 and piston 256 cause the pressure in sub-chamber 286 to increase. At the same time, pressure in chambers 216 and 220 decreases. As the pressure in sub-chamber 286 increases, valve member 250 responds by rising to its other operative position wherein piston 254 engages valve seat 260 and piston 256 engages valve seat 262. With valve member 250 in this second operative position which will be referred to as the "teller send" position, a flow path is developed from work port 226 through bore 230 to provide a supply of air to lower pump 236. Also, movement of the valve member 250 to its second position reconnects sub-chamber 286 with sub-chamber 284 and intake/exhaust port 228. Air forced into now opened sub-chamber 286 by pump 236 is directed outwardly through sub-chamber 286, through bore 278, and to sub-chamber 284 intake/exhaust port 228.

Figure 7:
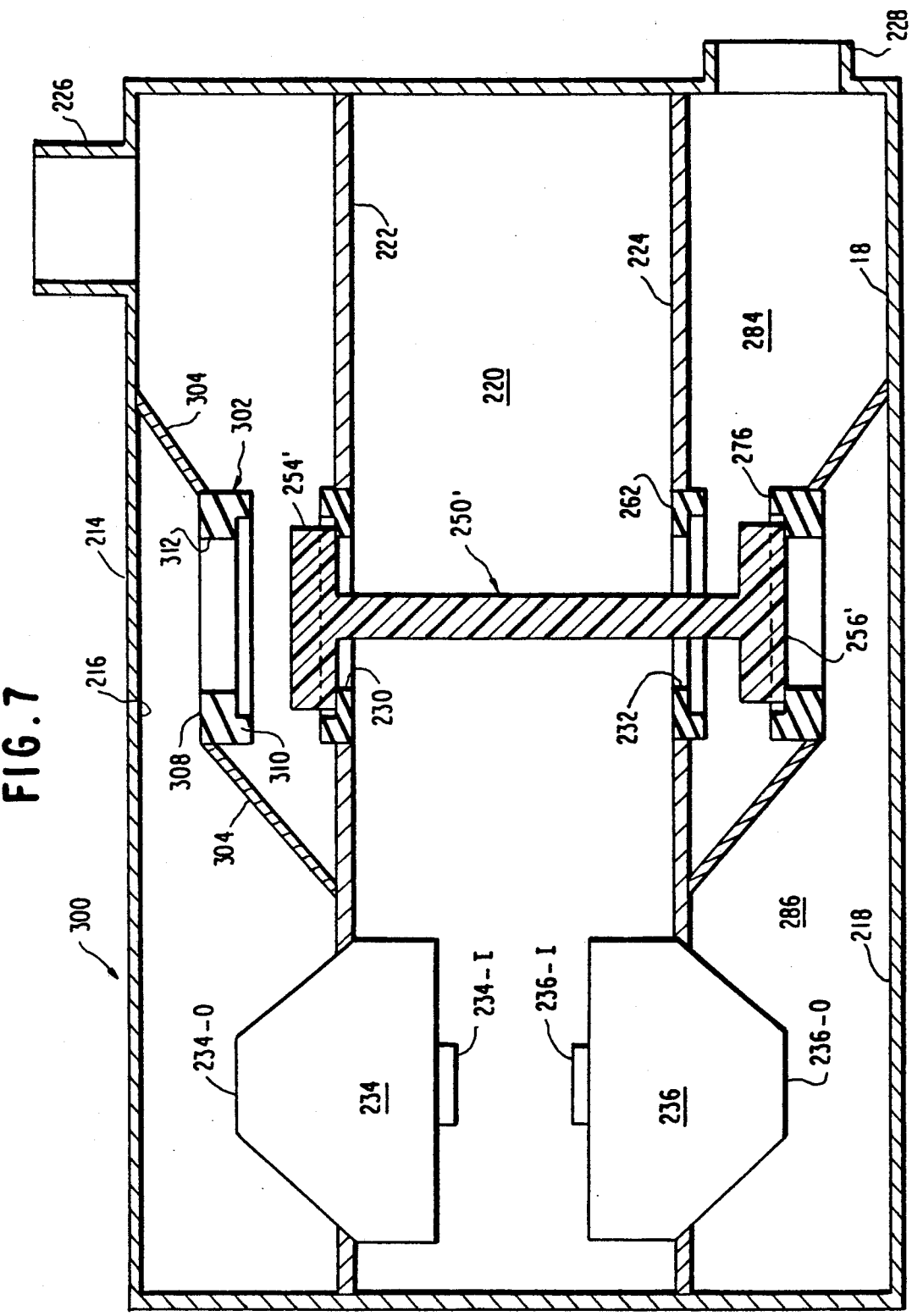
FIG. 7 is a partial side cross-sectional view schematically illustrating another embodiment of a suitable air pressure regulation device.

FIG. 7 shows an alternative embodiment of a preferred pressure regulation system 300. System 300 differs from system 210 by inclusion of a second air dam means 302 disposed within an upper flow chamber 216. The arrangement of two air dams in system 300 eliminates any dependence on gravity, and thus system 300 can be operated in any orientation such as lying on its side. Also, in system 300, the valve member 250' comprises a plastic material. Otherwise, system 300 is similar to system 210. Air dam means 302 has a section 304 which extends between the upper wall 214 to interior wall 222 and a horizontal section 308 which connects section 304 and provides a valve seat 310. Section 308 likewise has a bore 312.

It is to be understood that there can be various changes and modifications to the preferred embodiments of the system of the present invention disclosed herein, which changes and/or modifications may be made by one ordinary skill in the art, but would still result in a system well within the scope of the invention as set forth in the claims.

What is claimed is:

1. Apparatus for selectively supporting a carrier within a pneumatic tube station and releasing the carrier for transport through a tube network from the station, said apparatus comprising:
    an interior mounting adapted to be disposed within the pneumatic tube station;
    a detent member having a first portion, a second portion, and a third portion, said third portion pivotably mounting said detent member to said interior mounting;
    means having elasticity for biasing said detent member towards a first position wherein said first portion thereof contacts the carrier to support the carrier within the station; and
    release means for engaging said second portion of said detent member and urging said detent member against the biasing by said biasing means in response to air pressure, whereby said detent member pivots to move said first portion thereof out of contact with the carrier to release the carrier.

2. An apparatus as claimed in claim 1, wherein said interior mounting defines a detent chamber, a coupling chamber, and an intermediate chamber communicating with each of said detent chamber and said coupling chamber, said detent member being pivotably mounted in said detent chamber and said release means being disposed within said intermediate chamber.

3. An apparatus as claimed in claim 2, wherein said interior mounting forms an interior housing which further defines a carrier chamber adapted to communicate with a first air passage, a first port between said coupling chamber and said carrier chamber, a second port between said intermediate chamber and said carrier chamber, a third port between said coupling chamber and said intermediate chamber, and a fourth port between said intermediate chamber and said detent chamber, and wherein a valve is provided to prevent air flow between said coupling and carrier chambers whenever greater pressure is present in said coupling chamber than is present in said carrier chamber, and a guide member is provided in said intermediate chamber for guiding said release means, said guide member having ports therein for providing communication between said coupling chamber and said carrier chamber through said intermediate chamber when said release means urges said detent member to release the carrier.

4. An apparatus as claimed in claim 3, wherein said guide member comprises a cylindrical member and said release means comprises a piston disposed for reciprocal movement within in said cylindrical member.

5. An apparatus as claimed in claim 4, wherein said piston of said release means comprises a disk-shaped member and said release means further comprises a plunger mounting said disk-shaped member, said plunger engaging said second portion of said detent member.

6. An apparatus as claimed in claim 3, wherein said detent member comprises a unitary body having a cut-out section which forms said second portion.

7. An apparatus as claimed in claim 6, wherein said first portion comprises an arcuate contact surface.

8. An apparatus as claimed in claim 7, wherein said cut-out section is defined by vertical side walls, a vertical front wall, and a sloping wall which intersects said vertical side walls.

9. A station for providing access to a carrier in a pneumatic tube transportation system, said station comprising:
    a first air-passage means for providing communication with a transport tube of the transportation system, and a second air-passage means;
    means defining a carrier chamber in communication with said first air-passage means, a coupling chamber in communication with said second air-passage means, a detent chamber in communication with said carrier chamber and said first air-passage means, and an intermediate chamber located between said coupling chamber and said detent chamber and having a port for placing said intermediate chamber in communication with said carrier chamber;
    a valve which closes to prevent air flow directly from said coupling chamber to said carrier chamber in response to greater pressure in said coupling chamber than is present in said carrier chamber;
    a detent member pivotally mounted within said detent chamber, said detent member having a first portion which extends into said carrier chamber to support the carrier when said detent member is in a first position, and a second portion which extends into said detent chamber;
    a biasing mechanism for biasing said detent member into said first position; and
    a piston and link assembly responsive to air pressure increases in said coupling chamber for urging said second portion of said detent member against a bias of said biasing mechanism to place said detent member in a second position wherein said first detent member portion is substantially withdrawn from within said carrier chamber.

10. A station as claimed in claim 9, wherein said detent member comprises a unitary body having a cut-out section which forms said second portion.

11. A station as claimed in claim 10, wherein said first portion comprises an arcuate contact surface.

12. A station as claimed in claim 11, wherein said cut-out section is defined by vertical side walls, a vertical front wall, and a sloping wall which intersects said vertical side walls.

13. A station as claimed in claim 12, wherein said piston and link assembly comprises a piston mounted to a plunger, said plunger engaging said second portion of said detent member.

14. A station as claimed in claim 13, further comprising a guide member disposed within said intermediate chamber for guiding reciprocal movement of said piston, said guide member having ports therethrough, said piston and said guide member cooperating to prevent air flow from said coupling chamber to said carrier chamber through said intermediate chamber when said piston is in a first position, and to permit air flow from said coupling chamber to said carrier chamber when said piston is in a second position.

15. A station as claimed in claim 14, wherein said guide member is cylindrical.

16. A banking service pneumatic tube system for transporting between teller and customer terminals along a single conveyor tube network to which each of said terminals is connected, said terminals each having a first air passage by which they are connected to said network, and a second air passage, said system comprising:

an air pressure regulator apparatus connected to the second air passage of one of said terminals, the other of said terminals having the second air passage in communication with atmospheric pressure; and in at least one of said terminals:

means defining a carrier chamber in communication with said first air passage, a coupling chamber in communication with said second air passage, a detent chamber in communication with said carrier chamber and said first air passage, and an intermediate chamber located between said coupling chamber and said detent chamber and having a port for placing said intermediate chamber in communication with said carrier chamber, a valve which closes to prevent air flow directly from said coupling chamber to said carrier chamber in response to greater pressure in said coupling chamber than is present in said carrier chamber, a detent member pivotally mounted within said detent chamber, said detent member having a first portion which extends into said carrier chamber to support a carrier received within said carrier chamber when said detent member is in a first position, and a second portion which extends into said detent chamber to place said detent member in a second position wherein said first detent member portion is substantially withdrawn from within said carrier chamber, a biasing mechanism for biasing said detent member into said first position, and a piston and link assembly comprising a piston responsive to air pressure in said coupling chamber for urging said second portion of said detent member against a bias of said biasing mechanism when air pressure in said coupling chamber causes said valve to close.

17. A banking service pneumatic tube system as claimed in claim 16, further comprising a guide member disposed within said intermediate chamber for guiding reciprocal movement of said piston, said guide member having ports therethrough, said piston and said guide member cooperating to prevent air flow from said coupling chamber to said carrier chamber through said intermediate chamber when said piston is in a first position, and to permit air flow from said coupling chamber to said carrier chamber when said piston in a second position.

18. A banking service pneumatic tube system as claimed in claim 17, wherein said guide member is cylindrical.

19. A banking service pneumatic tube system as claimed in claim 17, wherein said first portion of said detent member comprises an arcuate contact surface, and wherein a cut-out section is defined by vertical side walls, a vertical front wall, and a sloping wall which intersects said vertical side walls.

20. A banking service pneumatic tube system as claimed in claim 19, wherein said piston and link assembly comprises a disk-shaped piston mounted to a plunger, said plunger engaging said second portion of said detent member.

* * * * *